(12) United States Patent
Jacob et al.

(10) Patent No.: US 9,065,586 B2
(45) Date of Patent: Jun. 23, 2015

(54) CARRIER DETECTION AND PARALLEL GSM CELL SEARCH IN MULTIMODE TERMINALS

(71) Applicant: ST-Ericsson SA, Plan-les-Ouates (CH)

(72) Inventors: Naveen Jacob, Kottayam (IN); Sajal Kumar Das, Bangalore (IN); Ravi Jandial, Bangalore (IN); Ivine Kuruvila, Kottayam (IN)

(73) Assignee: ST-Ericsson SA, Plan-les-Ouates (CH)

( * ) Notice: Subject to any disclaimer, the term of this patent is extended or adjusted under 35 U.S.C. 154(b) by 278 days.

(21) Appl. No.: 13/852,447

(22) Filed: Mar. 28, 2013

(65) Prior Publication Data

US 2013/0295925 A1 Nov. 7, 2013

Related U.S. Application Data

(60) Provisional application No. 61/620,196, filed on Apr. 4, 2012.

(30) Foreign Application Priority Data

Mar. 30, 2012 (EP) .................................... 12162785

(51) Int. Cl.
*H04W 4/00* (2009.01)
*H04J 11/00* (2006.01)
(Continued)

(52) U.S. Cl.
CPC ......... *H04J 11/0089* (2013.01); *H04J 11/0069* (2013.01); *H04W 48/16* (2013.01); *H04L 27/265* (2013.01)

(58) Field of Classification Search
CPC ..... H04W 48/16; H04W 48/18; H04W 72/02; H04J 11/0069; H04J 11/0089; H04L 27/265
See application file for complete search history.

(56) References Cited

U.S. PATENT DOCUMENTS

2001/0055328 A1 12/2001 Dowling
2007/0254612 A1 11/2007 Simmons et al.
(Continued)

FOREIGN PATENT DOCUMENTS

EP 2432181 A1 3/2012

OTHER PUBLICATIONS

Setiawan et al. "Common Wireless Communication Services Recognition for GSM, UMTS and LTE via Synchronization Channels Detection." Communications and Information Technology, 9th International Symposium, Piscataway, NJ, IEEE, XP031571166, Sep. 28, 2009, pp. 1280-1285.
(Continued)

*Primary Examiner* — Nathan Mitchell
*Assistant Examiner* — Shantell L Heiber
(74) *Attorney, Agent, or Firm* — Coats & Bennett, PLLC (57) ABSTRACT

A wireless communication apparatus is arranged to detect, among a plurality of modulated carrier signals of different frequencies, at least one of the modulated carrier signals modulated with a tone burst. A receiver provides a composite signal comprising the plurality of modulated carrier signals received simultaneously. An ADC generates samples of the composite signal, and the samples of the composite signal are divided into a plurality of blocks. The samples of each block are transformed into frequency domain components, and the frequency domain components of each block are divided into a plurality of groups, each group corresponding to a range of frequencies occupied by a different one of the modulated carrier signals. Tone burst detection is performed on each group, and it is determined which of the modulated carrier signals is modulated with the tone burst, according to which of the groups the tone burst is detected in.

21 Claims, 6 Drawing Sheets

(51) Int. Cl.
*H04L 27/26* (2006.01)
*H04W 48/16* (2009.01)

(56) References Cited

U.S. PATENT DOCUMENTS

2008/0299927 A1* 12/2008 Tenbrook et al. .......... 455/226.2

2011/0034168 A1 2/2011 Lindoff et al.
2011/0117911 A1* 5/2011 Narang et al. ................ 455/434

OTHER PUBLICATIONS

Chen et al. A Low-Cost and High Performance Solution to Frequency Estimation for GSM/EDGE. Texas Wireless Symposium, 2005, pp. 6-10.

* cited by examiner

CARRIER DETECTION AND PARALLEL GSM CELL SEARCH IN MULTIMODE TERMINALS

This application claims priority to U.S. Provisional Patent Application Ser. No. 61/620,196 titled "Carrier Detection and Parallel GSM Cell Search in Multimode Terminals," filed Apr. 4, 2012, the disclosure of which is incorporated herein by reference in its entirety.

This application claims priority to European Patent Application No. EP 12162785.5, filed Mar. 30, 2012, the disclosure of which is incorporated herein by reference in its entirety.

FIELD OF INVENTION

The present invention relates generally to wireless telecommunications, and in particular to an apparatus, method, and computer program code implementing a method of detecting, among a plurality of modulated radio frequency carrier signals of different frequencies, at least one of the carrier signals modulated with a tone burst.

BACKGROUND

A typical wireless communication apparatus, such as a mobile terminal, is required to scan a range of radio frequencies in order to identify available communication systems and radio frequency (RF) carrier signals. In order to decode information transmitted by a communication system, the mobile terminal is required to synchronize to the system, for which purpose synchronization information is transmitted by base stations of the communication system.

For example, in a communications system operating in accordance with the GSM standard, a base station in each cell transmits, on a broadcast control channel (BCCH), a frequency correction channel (FCCH) and a synchronization channel (SCH). The FCCH enables a mobile terminal to synchronize its local oscillator to the base station and then to receive the synchronization channel (SCH), which provides further synchronization information. The FCCH consists solely of a tone burst at 67.7 kHz relative to a carrier center frequency. On those carrier signals conveying the FCCH, the FCCH is transmitted once every 10 frames, corresponding to a rate of once every 46.15 ms, and the tone burst has a duration of 576.92 μs.

After initial power-on, a GSM mobile terminal typically tunes sequentially to available RF carrier signals that could potentially convey the broadcast channel of suitable cells, and measures the received signal strength of each of these channels. Each time that a carrier signal having a sufficient received signal strength is detected, the mobile terminal attempts to detect the FCCH and synchronize the frequency of its local oscillator to the carrier signal, and then attempts to detect the SCH and synchronize to the GSM frames and time slots, followed by decoding broadcast system information to check the suitability of the cell.

A multi-mode mobile terminal, capable of operating in accordance with more than one radio access technology (RAT), is potentially required to measure the received signal strength and perform cell selection for each carrier signal of each RAT. For example, the mobile terminal may evaluate carriers for each RAT in an order of preference until a suitable cell is identified, such as a fourth generation (4G) technology first, followed by a third generation (3G) technology, and finally a second generation (2G) technology. Such a process can result in an undesirably long delay before a cell is selected.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a plurality of modulated carrier signals of different frequencies is simultaneously received. The signals are digitized and divided into blocks. Signal samples from each block are transformed into the frequency domain, and the frequency domain components are formed into a plurality of groups, each corresponding to a range of frequencies occupied by a different one of the modulated carrier signals. Tone burst detection is performed on each group, and the results recorded. The detection of a tone burst indicates, e.g., a GSM FCCH signal. The received signal strength of the detected tone signals may be compared, to select candidate carrier frequencies on which to synchronize and decode broadcast system information.

One embodiment relates to a method of detecting, among a plurality of modulated carrier signals of different frequencies, at least one of the carrier signals modulated with a tone burst having a tone burst duration, wherein the modulated carrier signals GSM carrier signals and the tone burst is contained within a GSM FCCH. A composite signal comprising the plurality of modulated carrier signals received simultaneously is generated, using a receiver adapted to receive signals in accordance with the 3GPP LTE specifications. Samples are generated by sampling the composite signal. The samples of the composite signal are divided into a plurality of blocks, each of the blocks comprising a number of samples corresponding to not more than half of the tone burst duration. The samples of each block are transformed into frequency domain components. The frequency domain components of each block are divided into a plurality of groups, each group corresponding to a range of frequencies occupied by a different one of the modulated carrier signals. Tone burst detection is performed on each group. A determination of which of the carrier signals is modulated with the tone burst is made, according to which of the groups the tone burst is detected in.

Another embodiment relates to a wireless communication apparatus arranged to detect, among a plurality of modulated carrier signals of different frequencies, at least one of the modulated carrier signals modulated with a tone burst having a tone burst duration, wherein the modulated carrier signals are GSM carrier signals and the tone burst is contained within a GSM FCCH. The wireless communication apparatus includes a receiver adapted to receive signals in accordance with the 3GPP LTE specifications and arranged to provide a composite signal comprising the plurality of modulated carrier signals received simultaneously. The apparatus also includes an analog-to-digital converter arranged to generate samples of the composite signal, and a block formation stage arranged to divide the samples of the composite signal into a plurality of blocks, each of the blocks comprising a number of samples corresponding to not more than half of the tone burst duration. The apparatus further includes a transform stage arranged to transform the samples of each block into frequency domain components, and a group formation stage arranged to divide the frequency domain components of each block into a plurality of groups, each group corresponding to a range of frequencies occupied by a different one of the modulated carrier signals. The apparatus still further includes a tone burst detection stage arranged to perform tone burst detection on each group, and a recording stage arranged to record which of the modulated carrier signals is modulated with the tone burst, according to which of the groups the tone burst is detected in.

Yet another embodiment relates to a nontransient machine-readable medium storing computer program code arranged for, when executed on a processor, processing samples of a composite signal comprising a plurality of modulated carrier signals of different frequencies according to the following steps, wherein the modulated carrier signals are GSM carrier signals and at least one of the carrier signals is modulated with a tone burst having a tone burst duration and contained within a GSM FCCH. The steps performed by the computer program code comprise dividing the samples of the composite signal into a plurality of blocks, each of the blocks comprising a number of samples corresponding to not more than half of the tone burst duration; transforming the samples of each block into frequency domain components; dividing the frequency domain components of each block into a plurality of groups, each group corresponding to a range of frequencies occupied by a different one of the modulated carrier signals; performing tone burst detection on each group; and determining which of the carrier signals is modulated with the tone burst, according to which of the groups the tone burst is detected in.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
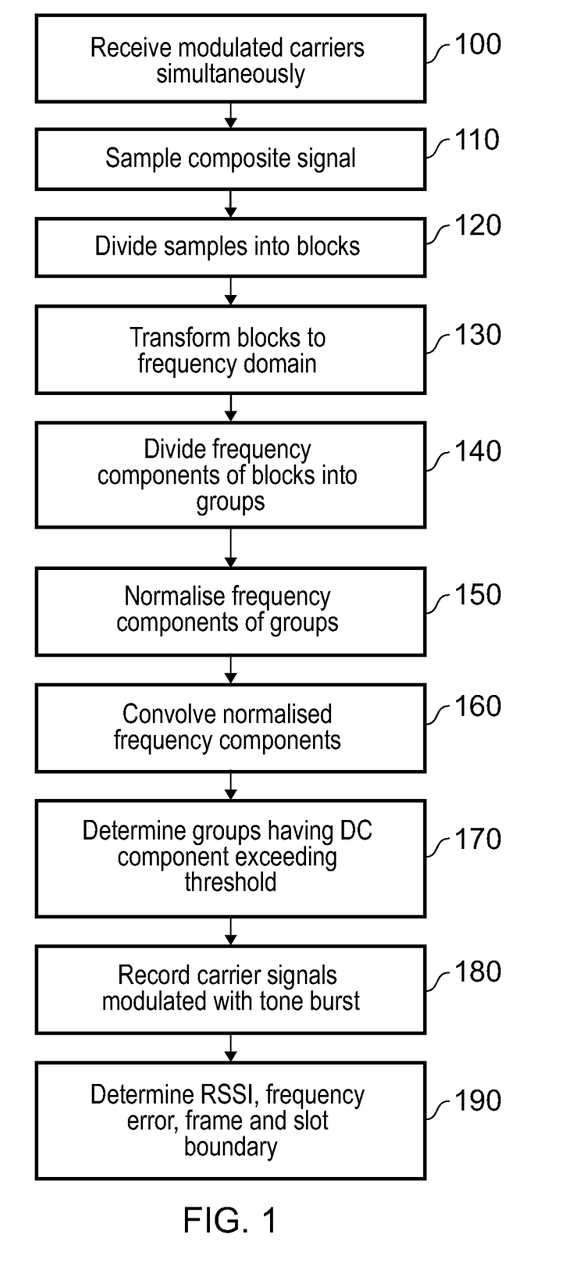
FIG. 1 is a flow chart depicting a method of detecting a carrier signal modulated with a tone burst.

A first embodiment of the method is described with reference to GSM and 3GPP LTE, the latter being referred to simply as LTE, as is customary. Referring to FIG. 1, a method comprises, at step 100, receiving simultaneously a plurality of modulated carrier signals of different frequencies. Each of the modulated carrier signals may be a GSM carrier signal, the modulated carrier signals being spaced apart by 200 kHz occupying a frequency range, that is, a bandwidth, of 270.833 kHz. The plurality of GSM carrier signals may be received simultaneously by an LTE receiver, an LTE receiver being a receiver configured for receiving an LTE signal, which can be a multi-carrier signal occupying 5 or 20 MHz. Therefore, up to 25 or 100 GSM carrier signals, consecutive in the frequency domain, may be received simultaneously by an LTE receiver, although it is not essential for the GSM carrier signals to be consecutive in the frequency domain. The modulated carrier signals may be received for a period of time that will ensure that a tone burst will have been transmitted on those modulated carrier signals that convey the tone burst periodically. Therefore, the receive period typically has a minimum duration corresponding to the maximum time between the start of one tone burst and the end of the next tone burst transmitted by the same modulated carrier signal. In other words, the receive period is not less than the interval at which the tone burst is transmitted plus the tone burst duration. In the case of GSM, therefore, the minimum receive period is 12 frames, corresponding to a duration of 55.38 ms.

At step 110 the composite received signal, corresponding to the plurality of modulated carrier signal received simultaneously, is sampled to convert the composite signal to the digital domain. A suitable sample rate for the LTE receiver is 30.72 M samples/sec.

At step 120, the samples of the composite signal are divided into blocks of consecutive samples. In order to ensure that, in at least one of the blocks, the tone burst is present throughout the block, each block may correspond to no more than half the tone burst duration. In the case of GSM, where the FCCH has a duration of 0.577 ms, and of reception by an LTE receiver employing a sample rate of 30.72 M samples/sec, each block has no more than 17725 samples in this example. The block length may be, for example, $2^{13}=8192$ samples. This number, being power of two, enables transformation to the frequency domain to be performed efficiently, as described below.

At step 130, each of the blocks of samples is transformed to the frequency domain. For this transformation, a Fast Fourier Transform (FFT) may be used. The result of the transform is, for each block, a plurality of frequency domain components of defined magnitudes, each corresponding to a spectral bin of the FFT. With a sample rate of 30.72 M samples/sec and an 8192-point FFT, the frequency domain components are spaced by 30.72/8192 MHz, that is, 3.75 kHz.

At step 140, the frequency domain components for each block are divided into groups. Each group is selected to correspond to a range of frequencies occupied by a different one of the modulated carrier signals. In the case of GSM, the center frequencies of the modulated carrier signals are known, and may be stored, for example in a look-up table, and the division of the frequency domain components into blocks may align the center of each block with a center frequency of a modulated carrier, except for an error of +/−15 kHz attributed to a frequency error of a crystal or local oscillator. For GSM, the center frequencies of the modulated carrier signals are spaced by 200 kHz, and therefore, each group may contain 53 of the frequency domain components spaced by 3.75 kHz.

Steps 150, 160 and 170 together constitute performing a tone burst detection algorithm, in the frequency domain, on each group of frequency domain components. At step 150, the frequency domain components of each group are normalized. This may be performed by dividing each frequency domain component within the group by the root mean square (RMS) value of all of the frequency domain components in the group. At step 160, for each group, a vector X(f) formed by the normalized frequency domain components in the group is convolved with its mirror-image conjugate $X^*(-f)$ multiplied by $e^{jw\tau}$, where w is frequency and $\tau$ is a delay, to provide a frequency domain indication of signal autocorrelation. The frequency domain indication of signal autocorrelation may be expressed as $$R(f)=\text{convolution}(X(f), X^*(-f)e^{jw\tau}) \quad (1)$$

In the context of GSM, $\tau$ may be selected to be a delay corresponding to 5 GSM symbols, this value being chosen to exceed an RF front end filter delay in the LTE receiver, to avoid introducing correlation in the RF front end filter.

When a group corresponds to a carrier signal modulated by a tone burst, the result of the convolution, R(f), will have a strong DC component, that is, the frequency domain component at DC, R(0), will have a relatively high value. Therefore, at step 170, those groups having a strong DC component are determined by comparing the frequency domain component at DC with the average value of all other frequency domain components in the group. In particular, the ratio of the frequency domain component at DC to the average value of all other frequency domain components in the group, which may be expressed as $R(0)/\text{average}(R(f\neq 0))$, may be calculated and compared with a threshold. At step 180, the modulated carrier signals that correspond to those groups that are determined, at step 170, as having a strong DC component, and in particular for which the above ratio exceeds the threshold, are recorded, for example in a cell search list, these being considered as being modulated with the tone burst. The value of the threshold may be selected to suit operational requirements, a suitable value being determined by means of computer simulation. In particular, the threshold may be selected as a trade-off between the probability of correctly detecting the tone burst and the probability of falsely detecting a tone burst.

Having identified those modulated carrier signals that are modulated by the tone burst, step 190 is an optional step which can contribute further to synchronization. At step 190, an RSSI may be determined for one or more of the modulated carrier signals that are modulated with the tone burst. The RSSI may be determined as the mean square value of the frequency domain components within a group, without normalization. The RSSI may be used subsequently for selecting a strong modulated carrier signal for further cell selection steps. Also at step 190, a frequency error of the local oscillator of the receiver, relative to one or more of the modulated carrier signals, may be evaluated with a precision equal to the frequency spacing between the frequency domain components in each group, that is, with a resolution equal to the spacing of the spectral bins of the FFT. In the case of a GSM modulated carrier signal, this frequency error may be evaluated as $$F_{ARFCN}+67.71 \text{ kHz}-F_{MAX} \quad (2)$$

where $F_{ARFCN}$ is the center frequency of the GSM modulated carrier signal, such GSM carrier signals generally being identified by an Absolute Radio Frequency Channel Number (ARFCN), and $F_{MAX}$ is the frequency of the frequency domain component having the largest absolute value in the group corresponding to the GSM modulated carrier signal. The 67.71 kHz in equation (2) is the baseband frequency of the tone burst in the FCCH. Also at step 190, in the case of a GSM modulated carrier signal, the GSM frame and slot boundaries may be determined, with a precision equal to one block duration, that is, half the duration of the FCCH, according to which of the blocks the tone burst is detected in, because the FCCH containing the tone burst is transmitted in only the first time slot of a GSM frame. In this way, frame and slot synchronization may be provided.

Figure 2:
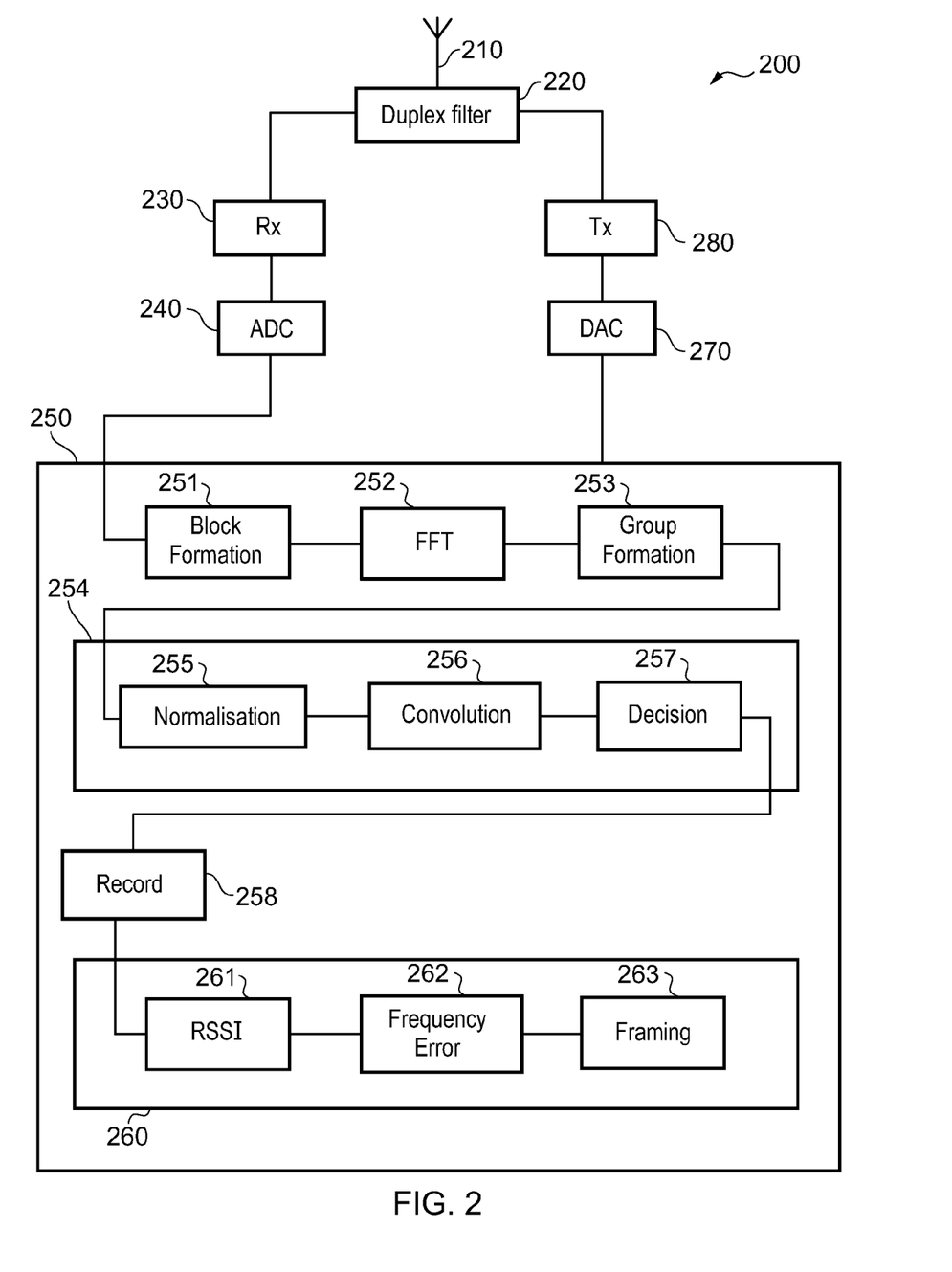
FIG. 2 is a functional block schematic diagram of a wireless communication apparatus.

Referring to FIG. 2, a wireless communication apparatus 200, such as a mobile terminal or mobile phone, comprises an antenna 210 coupled to a duplex filter 220. An output of the duplex filter 220 is coupled to an input of a receiver 230 which is arranged to receive a plurality of modulated carrier signals at different frequencies simultaneously to provide a composite signal. The receiver 230 may be, for example, an LTE receiver arranged to receive a plurality of GSM modulated carrier signals simultaneously. The composite signal, which comprises the plurality of modulated carrier signals, is delivered at an output of the receiver 230 that is coupled to an input of an analogue-to-digital converter (ADC) 240 that samples the composite signal, delivering samples of the composite signal at an output of the ADC 240. In the case of an LTE receiver, the sample rate may be, for example, 30.72 M samples/sec. In the case of GSM modulated carrier signals, the composite signal may be sampled for a period of time corresponding to a minimum of 12 GSM frames, that is 55.38 ms, to ensure that an FCCH will have been received if any of the GSM modulated carrier signals are conveying a broadcast channel, BCCH. The output of the ADC 240 is coupled to an input of a processing stage 250 for processing the samples of the composite signal.

The processing stage 250 comprises a block formation stage 251, a transform stage 252, a group formation stage 253, a tone burst detection stage 254, a recording stage 258 and a further processing stage 260. Each of these stages is described below.

The wireless communication apparatus 200 also comprises a digital-to-analogue converter (DAC) 270 having an input coupled to the processing stage 250 for receiving signals to be transmitted. An output of the DAC 270 is coupled to an input of a transmitter 280 for converting signals into a suitable form for transmission, and an output of the transmitter 280 is coupled to an input of the duplex filter 220 for coupling the signals for transmission to the antenna 210.

An input of the block formation stage 251 is coupled to the input of the processing stage 250 for receiving the samples of the composite signal, and the block formation stage 251 divides the samples of the composite signal into a plurality of blocks. Each of the blocks comprises a number of the samples corresponding to not more than half of the tone burst duration. Therefore, for the case of GSM modulated carrier signals, where the FCCH duration and tone burst duration is 0.577 ms, and an LTE receiver operating with a sample rate of 30.72 M samples/sec, each tone burst corresponds to 17725 samples, and in one embodiment a convenient block size is 8192.

An output of the block formation stage 251 is coupled to an input of the transform stage that transforms the samples of each block into frequency domain components. The transform stage may implement, in one embodiment, an FFT, and where the block size is 8192, this may be an 8192-point FFT, which provides 8192 frequency domain components corresponding to 8192 spectral bins of the FFT. An output of the transform stage 252 is coupled to an input of the group formation stage 253 that divides the frequency domain components of each block into a plurality of groups, each group corresponding to a range of frequencies occupied by a different one of the modulated carrier signals. Therefore, for the case a sample rate of 30.72 M samples/sec and an 8192-point FFT, the frequency domain components are separated by 3.75 kHz, and a GSM modulated carrier signal which occupies a bandwidth of 200 kHz will comprise 53 frequency domain components, occupying 53 FFT spectral bins. An output of the group formation stage 253 is coupled to an input of the tone burst detection stage 254.

The tone burst detection stage 254 comprises a normalization stage 255 having an input coupled to the input of the tone burst detection stage 254, a convolution stage 256 having an input coupled to an output of the normalization stage 255, and a decision stage 257 having an input coupled to an output of the convolution stage 256 and an output coupled to an output of the tone burst detection stage 254. The normalization stage 255 normalizes the frequency domain components of each group, which may be performed by dividing each frequency domain component within the group by the RMS value of all of the frequency domain components in the group. The convolution stage 256 generates the frequency domain indication of signal autocorrelation, R(f), for each group by evaluating the expression in equation (1). The decision stage 257 determines those groups that have a strong DC component by comparing, for each group, the frequency domain component at DC with the average value of all other frequency domain components in the group. In particular, the decision stage 257 may calculate the ratio of the frequency domain component at DC to the average value of all other frequency domain components in the group, which may be expressed as R(0)/average(R(f≠0)), and compare the ratio with a threshold. Those groups for which the ratio exceeds the threshold are deemed to be modulated with the tone burst. An output of the tone burst detection stage 254, and therefore the output of the decision stage 257, is coupled to an input of a recording stage 258 which records an indication of those groups that are deemed to be modulated with the tone burst. An output of the recording stage 258 is coupled to an input of a further processing stage 260.

The further processing stage 260 comprises an RSSI stage 261 having an input coupled to the input of the further processing stage 260, a frequency error stage 262 having an input coupled to an output of the RSSI stage 261, and a framing stage 263 having an input coupled to an output of the frequency error stage 262. An output of the framing stage 263 may be coupled to further, non-illustrated stages that are not material to the present disclosure. The RSSI stage 261 determines, from the frequency domain components of the group corresponding in frequency to each of the carrier signals determined to be modulated with the tone burst, an RSSI. For example, the RSSI stage 261 may determine the RSSI as the mean square value of the frequency domain components within a group, without normalization. The frequency error stage 262 estimates a frequency error of the local oscillator of the receiver, relative to one or more of the modulated carrier signals. This frequency error, which may be evaluated with a precision equal to the frequency spacing between the frequency domain components in each group, is expressed in equation (2) for the case of GSM. The framing stage 263 determines, for the case of a GSM modulated carrier signal, the GSM frame and slot boundaries, with a precision equal to one block duration, that is, half the duration of the FCCH, according to which of the blocks the tone burst is detected in. The wireless communication apparatus 200 may employ the RSSI for selecting among modulated carrier signals in further stages of cell selection, may employ the frequency error for correcting its local oscillator frequency, and may employ the determined frame and slot boundaries for decoding system information conveyed by the modulated carrier signals.

The processing stage 250 may comprise a processor operating under the control of computer program code. The processor may comprise a sequential state machine operative to execute machine instructions stored as machine-readable computer programs in memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination thereof.

The processing stage 250 may comprise a data storage device storing computer program code arranged to perform, when executed on a processor, the operations described herein as being performed by any or all of: the block formation stage 251, the transform stage 252, the group formation stage 253, the normalization stage 255, the convolution stage 256, the decision stage 257, the recording stage 258, the RSSI stage 261, the frequency error stage 262 and the framing stage 263. Alternatively, any one or more of these stages may be implemented in hardware, such as in an ASIC block, with appropriate interconnection to the processor executing one or more other stages as software modules.

Such computer program code, and other data, may be carried by any nontransient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like.

Figure 3:
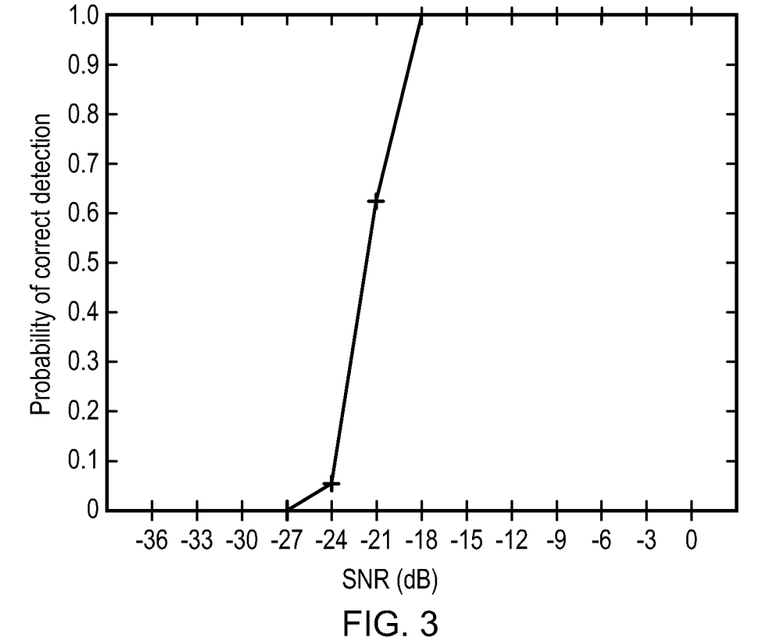
FIG. 3 is a graph depicting the probability of correct detection of a tone burst for a range of signal to noise ratios.

The performance of an exemplary method disclosed herein has been evaluated by means of computer simulation. Referring to FIG. 3, the probability of correct detection of the tone burst is plotted for a range of signal to noise ratios. It can be seen that the tone burst may be reliably detected for signal to noise ratios exceeding about −20 dB. The probability of falsely detecting the tone burst was evaluated as zero across the same range of signal to noise ratios.

Figure 4:
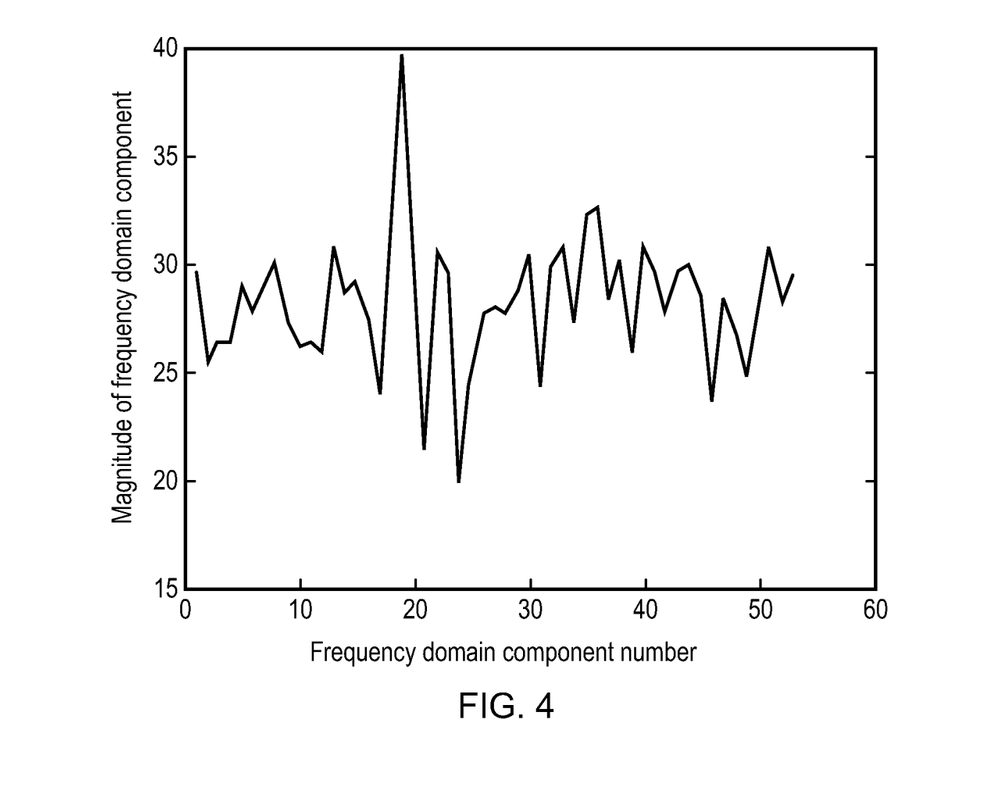
FIG. 4 is a graph illustrating magnitudes of the frequency domain components for a signal to noise ratio of −20 dB.

Referring to FIG. 4, the magnitude of the 53 frequency domain components corresponding to a GSM carrier signal modulated with an FCCH and having a signal to noise ratio of −20 dB is plotted. A distinct peak is visible at the nineteenth frequency domain component, corresponding to the nineteenth spectral bin which covers a frequency range 67.5 kHz to 71.25 kHz, which indicates the presence of the tone burst in the nineteenth frequency domain component, resulting from the tone burst having a frequency of 67.71 kHz relative to the center frequency of the GSM carrier signal.

Figure 5:
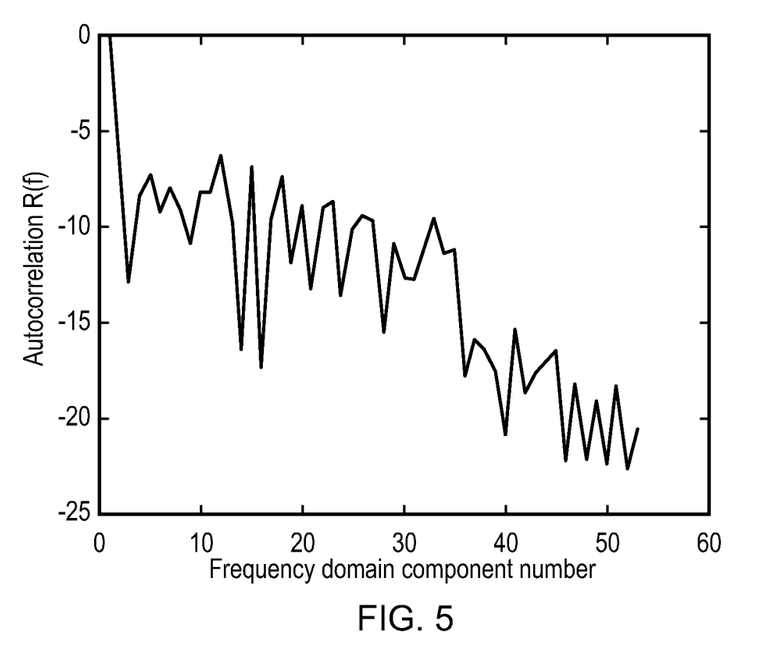
FIG. 5 is graph illustrating autocorrelation of the frequency domain components for a signal to noise ratio of −20 dB.
Figure 6:
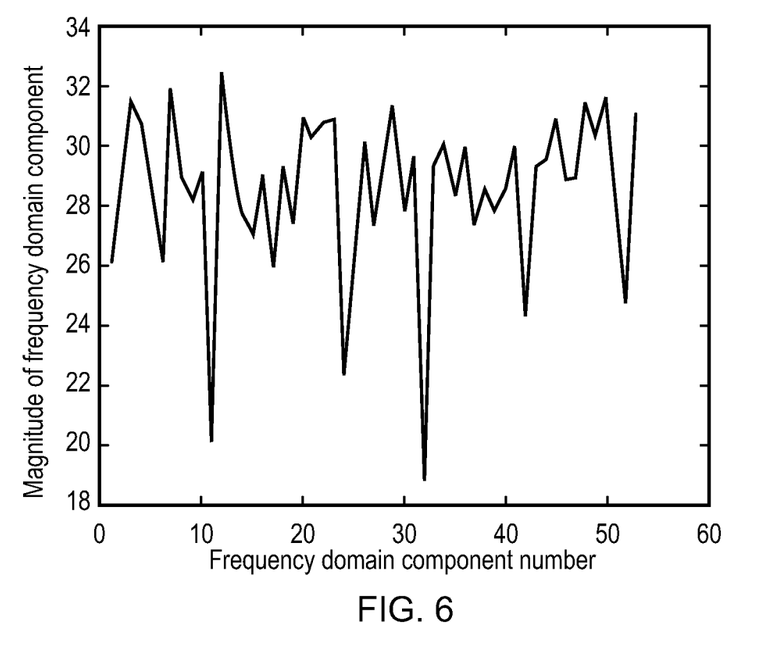
FIG. 6 is a graph illustrating magnitudes of the frequency domain components where the carrier signals are not modulated with a tone burst, for a signal to noise ratio of 0 dB.
Figure 7:
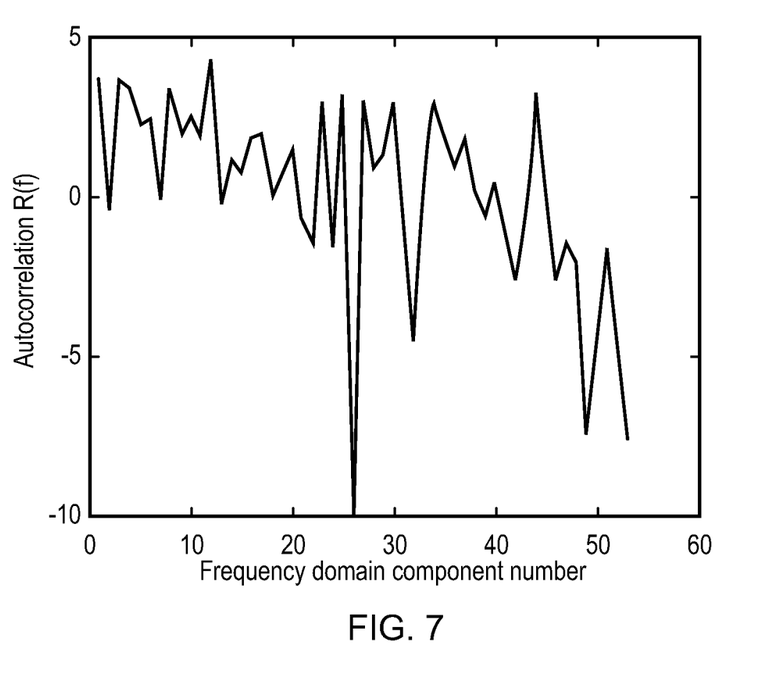
FIG. 7 is graph illustrating autocorrelation of the frequency domain components where the carrier signals are not modulated with a tone burst, for a signal to noise ratio of 0 dB.

Referring to FIG. 5, the frequency domain indication of signal autocorrelation, R(f), is plotted for the 53 frequency domain components corresponding to a GSM carrier signal modulated with a BCCH and having a signal to noise ratio of −20 dB. A distinct peak is visible at DC—that is, at the first spectral bin—indicating the presence of the tone burst. For comparison with FIG. 4, FIG. 6 shows the magnitude of the 53 frequency domain components corresponding to a GSM carrier signal which is not modulated with an FCCH, for a signal to noise ratio of −20 dB. It can be seen that there is no distinct peak visible in FIG. 6 corresponding to a tone burst. Likewise, for comparison with FIG. 5, FIG. 7 shows the frequency domain indication of signal autocorrelation, R(f), plotted for the 53 frequency domain components corresponding to a GSM carrier signal which is not modulated with a BCCH, for a signal to noise ratio of −20 dB. No distinct peak is visible at DC in FIG. 7, because of the absence of the tone burst.

Although the use of an LTE receiver for receiving GSM carrier signals modulated with an FCCH has been described for the purpose of illustration, other types of receiver may alternatively be used and other types of modulated carrier signals modulated with other types of tone burst may be received and detected.

Although a tone detection algorithm based on the frequency domain indication of signal autocorrelation defined by equation (1) has been described, other frequency domain tone detection algorithms may alternatively be used.

Although transformation of the samples of the composite signal to the frequency domain components has been described based on the use of an FFT, other types of transform from the time domain to the frequency domain may alternatively be used.

Other variations and modifications will be apparent to those of skill in the art. Such variations and modifications may involve equivalent and other features that are already known and which may be used instead of, or in addition to, features described herein. Features that are described in the context of separate embodiments may be provided in combination in a single embodiment. Conversely, features that are described in the context of a single embodiment may also be provided separately or in any suitable sub-combination.

It should be noted that the term "comprising" does not exclude other elements or steps, the term "a" or "an" does not exclude a plurality, a single feature may fulfill the functions of several features recited in the claims and reference signs in the claims shall not be construed as limiting the scope of the claims. It should also be noted that the Figures are not necessarily to scale; emphasis instead generally being placed upon illustrating the principles of the present invention.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of detecting, among a plurality of modulated carrier signals of different frequencies, at least one of the carrier signals modulated with a tone burst having a tone burst duration, wherein the modulated carrier signals are Global System for Mobile Communications (GSM) carrier signals and the tone burst is contained within a GSM Frequency Correction Channel (FCCH), the method comprising:
   generating a composite signal comprising the plurality of modulated carrier signals received simultaneously, using a receiver adapted to receive signals in accordance with Third Generation Partnership Project Long Term Evolution specifications;
   generating samples by sampling the composite signal;
   dividing the samples of the composite signal into a plurality of blocks, each of the blocks comprising a number of samples corresponding to not more than half of the tone burst duration;
   transforming the samples of each block into frequency domain components;
   dividing the frequency domain components of each block into a plurality of groups, each group corresponding to a range of frequencies occupied by a different one of the modulated carrier signals;
   performing tone burst detection on each group; and
   determining which of the carrier signals is modulated with the tone burst, according to which of the groups the tone burst is detected in.

2. The method of claim 1 wherein the tone burst occurs at time intervals of not less than a tone burst interval, and the method comprises receiving the plurality of modulated carrier signals simultaneously for a time period not less than the tone burst interval plus the tone burst duration.

3. The method of claim 1 wherein transforming the samples of each block into frequency domain components comprises performing a Fast Fourier Transform on the samples.

4. The method of claim 1 wherein performing tone burst detection comprises:
   convolving the frequency domain components with their mirror-imaged conjugate; and
   determining that a carrier signal is modulated by the tone burst if the convolved frequency domain components comprise a direct current (DC) component exceeding a threshold.

5. The method of claim 4 wherein the threshold is dependent on a mean of the convolved frequency domain components excluding the DC component.

6. The method of claim 4, further comprising normalizing the frequency domain components within each group prior to the convolving.

7. The method of claim 6 wherein normalizing the frequency domain components comprises dividing each frequency domain component within each group by a root mean square of the frequency domain components within each respective group.

8. The method of claim 1, further comprising determining a received signal strength indication from the frequency domain components of the group corresponding in frequency to each of the carrier signals determined to be modulated with the tone burst.

9. The method of claim 1, further comprising:
   determining, for at least one of the detected tone bursts, a tone frequency, the tone frequency being a frequency of the frequency domain component having a largest magnitude within the respective group in which the tone burst is detected; and
   estimating a frequency error dependent on a difference between the determined tone frequency and a frequency of the carrier signal modulated with the tone burst.

10. The method of claim 1, further comprising determining a start position of a GSM frame from a position, within the plurality of blocks, of a block comprising the group in which the tone burst is detected.

11. A wireless communication apparatus arranged to detect, among a plurality of modulated carrier signals of different frequencies, at least one of the modulated carrier signals modulated with a tone burst having a tone burst duration, wherein the modulated carrier signals are Global System for Mobile Communications (GSM) carrier signals and the tone burst is contained within a GSM Frequency Correction Channel (FCCH), the wireless communication apparatus comprising:
   a receiver adapted to receive signals in accordance with Third Generation Partnership Project Long Term Evolution specifications and arranged to provide a composite signal comprising the plurality of modulated carrier signals received simultaneously;

an analog-to-digital converter arranged to generate samples of the composite signal;

a block formation stage arranged to divide the samples of the composite signal into a plurality of blocks, each of the blocks comprising a number of samples corresponding to not more than half of the tone burst duration;

a transform stage arranged to transform the samples of each block into frequency domain components;

a group formation stage arranged to divide the frequency domain components of each block into a plurality of groups, each group corresponding to a range of frequencies occupied by a different one of the modulated carrier signals;

a tone burst detection stage arranged to perform tone burst detection on each group; and a recording stage arranged to record which of the modulated carrier signals is modulated with the tone burst, according to which of the groups the tone burst is detected in.

12. The apparatus of claim 11 wherein the tone burst occurs at time intervals of not less than a tone burst interval, and the tone burst detection stage is arranged to receive the plurality of modulated carrier signals simultaneously for a time period not less than the tone burst interval plus the tone burst duration.

13. The apparatus of claim 11 wherein the transform stage is arranged to transform the samples of each block into frequency domain components by performing a Fast Fourier Transform on the samples.

14. The apparatus of claim 11 wherein the tone burst detection stage is arranged to perform tone burst detection on each group by:

convolving the frequency domain components with their mirror-imaged conjugate; and determining that a carrier signal is modulated by the tone burst if the convolved frequency domain components comprise a direct current (DC) component exceeding a threshold.

15. The apparatus of claim 14 wherein the threshold is dependent on a mean of the convolved frequency domain components excluding the DC component.

16. The apparatus of claim 14 wherein the tone burst detection stage is further arranged to normalize the frequency domain components within each group prior to the convolving.

17. The apparatus of claim 16 wherein normalizing the frequency domain components comprises dividing each frequency domain component within each group by a root mean square of the frequency domain components within each respective group.

18. The apparatus of claim 11, further comprising a signal strength stage arranged to determine a received signal strength indication from the frequency domain components of the group corresponding in frequency to each of the carrier signals determined to be modulated with the tone burst.

19. The apparatus of claim 11, further comprising a frequency error stage arrange to determine, for at least one of the detected tone bursts, a tone frequency, the tone frequency being a frequency of the frequency domain component having a largest magnitude within the respective group in which the tone burst is detected; and estimate a frequency error dependent on a difference between the determined tone frequency and a frequency of the carrier signal modulated with the tone burst.

20. The apparatus of claim 11, further comprising a framing stage arranged to determine a start position of a GSM frame from a position, within the plurality of blocks, of a block comprising the group in which the tone burst is detected.

21. A non-transitory machine-readable medium storing computer program code arranged for, when executed on a processor, processing samples of a composite signal comprising a plurality of modulated carrier signals of different frequencies according to the following steps, wherein the modulated carrier signals are Global System for Mobile Communications (GSM) carrier signals and at least one of the carrier signals is modulated with a tone burst having a tone burst duration and contained within a GSM Frequency Correction Channel (FCCH):

dividing the samples of the composite signal into a plurality of blocks, each of the blocks comprising a number of samples corresponding to not more than half of the tone burst duration;

transforming the samples of each block into frequency domain components;

dividing the frequency domain components of each block into a plurality of groups, each group corresponding to a range of frequencies occupied by a different one of the modulated carrier signals;

performing tone burst detection on each group; and determining which of the carrier signals is modulated with the tone burst, according to which of the groups the tone burst is detected in.

\* \* \* \* \*